United States Patent
Keech et al.

(10) Patent No.: US 12,154,015 B2
(45) Date of Patent: *Nov. 26, 2024

(54) PROVIDING CUSTOM MACHINE-LEARNING MODELS

(71) Applicant: Microsoft Technology Licensing, LLC, Redmond, WA (US)

(72) Inventors: Jonathan Daniel Keech, Kirkland, WA (US); Kesavan Shanmugam, Redmond, WA (US); Simon Calvert, Sammamish, WA (US); Mark A Wilson-Thomas, Mercer Island, WA (US); Vivian Julia Lim, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/963,028

(22) Filed: Oct. 10, 2022

(65) Prior Publication Data

US 2023/0029481 A1    Feb. 2, 2023

Related U.S. Application Data

(63) Continuation of application No. 16/205,070, filed on Nov. 29, 2018, now Pat. No. 11,475,370.

(51) Int. Cl.
*G06F 8/33* (2018.01)
*G06N 20/20* (2019.01)

(52) U.S. Cl.
CPC ............... *G06N 20/20* (2019.01); *G06F 8/33* (2013.01)

(58) Field of Classification Search
CPC ..... G06F 8/33; G06F 8/35; G06F 8/37; G06F 8/40; G06F 8/41; G06N 20/00; G06N 20/20

See application file for complete search history.

(56) References Cited

U.S. PATENT DOCUMENTS

| | | | |
|---|---|---|---|
| 8,370,280 B1 * | 2/2013 | Lin | G06N 5/04 706/12 |
| 8,473,431 B1 * | 6/2013 | Mann | G06N 5/04 706/12 |

(Continued)

FOREIGN PATENT DOCUMENTS

WO    2016118813 A1    7/2016

OTHER PUBLICATIONS

Communication pursuant to Article 94(3) Received in European Patent Application No. 219813976.8, mailed on May 21, 2024, 11 pages.

*Primary Examiner* — Alvin H Tan
(74) *Attorney, Agent, or Firm* — Workman Nydegger

(57) ABSTRACT

Providing custom machine learning models to client computer systems. Multiple machine learning models are accessed. Client-specific data for multiple client computer systems are also accessed. For each of at least some of the client computer systems, performing the following actions: First, using the corresponding client-specific data for the corresponding client computer system to determine which subset of the multiple machine learning models is applicable to the corresponding client computer system. The subset of the multiple machine learning models includes more than one of the multiple machine learning models. Then, aggregating the determined subset of the multiple machine learning models to generate an aggregated subset of machine learning models that is customized to the corresponding client computer system.

20 Claims, 9 Drawing Sheets

(56) References Cited

U.S. PATENT DOCUMENTS

| | | | |
|---|---|---|---|
| 9,606,893 B2* | 3/2017 | Gupta | G06N 20/00 |
| 9,628,497 B2* | 4/2017 | Zambon | G06N 20/00 |
| 10,235,141 B2* | 3/2019 | Chacko | G06F 8/36 |
| 10,423,522 B2* | 9/2019 | Bergen | G06F 11/3604 |
| 11,501,191 B2* | 11/2022 | Shaikh | G06F 16/211 |
| 2016/0217387 A1* | 7/2016 | Okanohara | G06N 20/00 |
| 2017/0046510 A1* | 2/2017 | Chen | G06F 21/552 |
| 2019/0102700 A1* | 4/2019 | Babu | G06N 5/025 |

* cited by examiner

PROVIDING CUSTOM MACHINE-LEARNING MODELS

CROSS-REFERENCE TO RELATED APPLICATIONS

This application is a continuation of U.S. patent application Ser. No. 16/205,070 filed on Nov. 29, 2018, entitled "PROVIDING CUSTOM MACHINE-LEARNING MODELS," which application is expressly incorporated herein by reference in its entirety.

BACKGROUND

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually.

For a long period of time, computer systems did essentially what they were commanded to do by their instructions or software. However, software and the employment of hardware is becoming so advanced that computer systems are now, more than ever before, capable of some level of decision making at higher levels. At present, in some respects, the level of decision making can approach, rival, or even exceed the capability of the human brain to make decisions. In other words, computer systems are now capable of employing some level of artificial intelligence.

One example of artificial intelligence is machine learning. Machine learning uses computer systems to learn from data, identify patterns and make decisions with minimal human intervention. Different machine learning tools have been created to assist people or entities to explore and analyze their data, and build machine learning models based on the data analyzed. Some of these machine learning tools may also train and test the machine learning models built based on the data analyzed.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

At least some embodiment described herein relate to efficiently and securely providing custom machine learning models to client computer systems. In accordance with the principles described herein, multiple machine learning models may be input to the selection process for the client computer systems. The service system has access to the multiple machine learning models that are put to the selection process. Each of the client computer systems is capable of operating in at least one programming environment. For each of the client computer systems that operates in a particular programming environment, there is a set of relevant client-specific data. The service system also has access to the relevant client-specific data. For each of at least some of those client computer systems that operates in a programming environment, that corresponding client-specific data is used to determine which subset of the multiple machine learning models is applicable to the corresponding client computer system. Then, the determined subset of the multiple machine learning models is aggregated to generate an aggregated machine learning model that is customized to the corresponding client computer system. The aggregation of models may take place on the service computer system and/or the client computer systems.

There may be thousands of different machine learning models that a machine learning service provides. Not every one of these machine learning models is applicable to the programming environment that the client computer system operates in. Applying all of the machine learning models to the client-specific data is time and energy consuming. The principles described herein allow for smaller aggregated machine learning models to be provided to client computer systems. Furthermore, the system may also have the capability to perform additional filtering and aggregating within an aggregated model set. These smaller aggregated machine learning models are more suited to the client computing environment. Alternatively, specifics of a given aggregated model may be further filtered to be more efficient, since irrelevant and inapplicable machine learning models are eliminated from the filtering and aggregation. This makes the machine learning model more efficient to execute while remaining relevant to the client computer system. It also helps to ensure that the model results returned to the user are relevant to the task at hand, making for a more effective experience.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which.

DETAILED DESCRIPTION

At least some embodiment described herein relate to efficiently and securely providing custom machine learning models to client computer systems. In accordance with the principles described herein, multiple machine learning models may be input to the selection process for the client computer systems. The service system has access to the multiple machine learning models that are put to the selection process. Each of the client computer systems is capable of operating in at least one programming environment. For each of the client computer systems that operates in a particular programming environment, there is a set of relevant client-specific data. The service system also has access to the relevant client-specific data. For each of at least some of those client computer systems that operates in a programming environment, that corresponding client-specific data is used to determine which subset of the multiple machine learning models is applicable to the corresponding client computer system. Then, the determined subset of the multiple machine learning models is aggregated to generate an aggregated machine learning model that is customized to the corresponding client computer system. The aggregation of models may take place on the service computer system and/or the client computer systems.

There may be thousands of different machine learning models that a machine learning service provides. Not every one of these machine learning models is applicable to the programming environment that the client computer system operates in. Applying all of the machine learning models to the client-specific data is time and energy consuming. The principles described herein allow for smaller aggregated machine learning models to be provided to client computer systems. Furthermore, the system may also have the capability to perform additional filtering and aggregating within an aggregated model set. These smaller aggregated machine learning models are more suited to the client computing environment. Alternatively, specifics of a given aggregated model may be further filtered to be more efficient, since irrelevant and inapplicable machine learning models are eliminated from the filtering and aggregation. This makes the machine learning model more efficient to execute while remaining relevant to the client computer system. It also helps to ensure that the model results returned to the user are relevant to the task at hand, making for a more effective experience.

This patent application will be organized as follows. First, the principles involved in providing custom machine learning models to client computer systems will be described with respect to FIGS. 1 and 2. Then, examples of the integration of a subset of machine learning models into a single integrated model will be described with respect to FIGS. 3 through 7. Finally, because the principles described herein operate in the context of a computer system, a computer system will be described with respect to FIG. 12.

Figure 1:
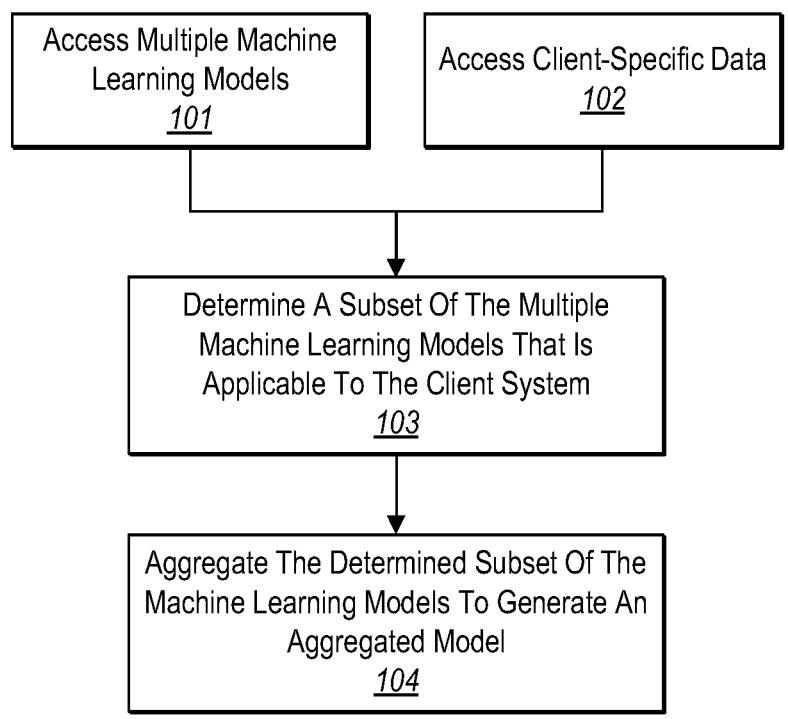
FIG. 1 illustrates a flowchart of a method for providing custom machine learning models to client computer systems.
Figure 2A:
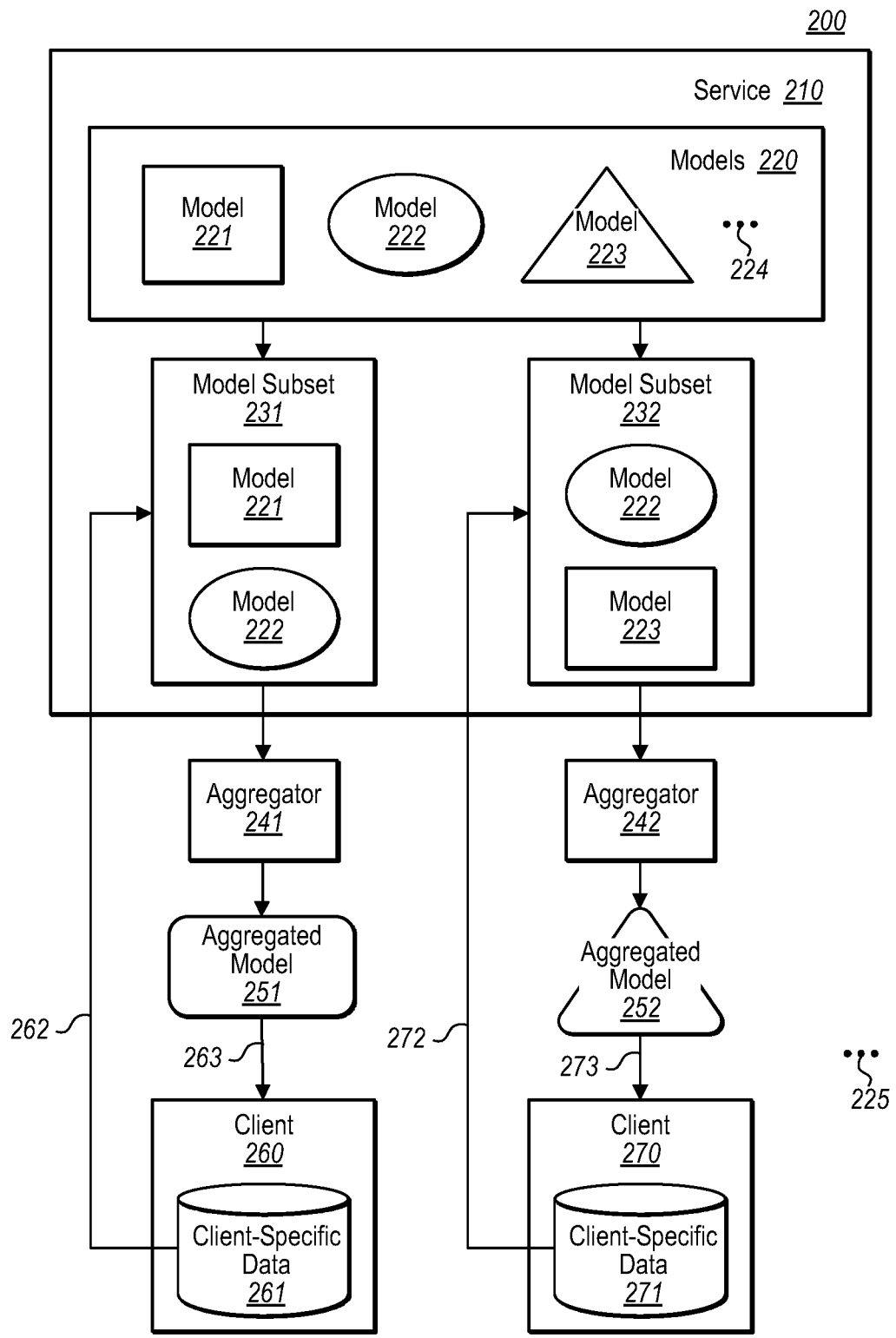
FIG. 2A illustrates an environment in which the method illustrated in FIG. 1 may be implemented.

FIG. 1 illustrates a flow chart of a method 100 for providing custom machine learning models to client computer systems (also called herein "client systems" or "clients") in accordance with the principles described herein. FIG. 2A illustrates an environment 200 in which the method 100 may be implemented. Accordingly, FIGS. 1 and 2 will be described together in this first section.

Referring to FIG. 1, the method 100 includes accessing multiple machine learning models (also called herein simply "models") contained on the computer system of the service provider (act 101). Client-specific data for each of the client computer systems is also accessed (act 102). Acts 101 and 102 are illustrated in parallel merely to demonstrate that there is no temporal dependency between these acts. For instance, the service provider might perhaps have constant access to the machine learning models as well as the client-specific data.

For each of at least some of the client systems, the client-specific data is used to determine which subset of the machine learning models is applicable to the corresponding client system (act 103). Next, the determined subset of the models is aggregated to generate an aggregated machine learning model (act 104). The aggregated machine learning model is a single integrated model that is customized to the corresponding client system. The single integrated model may serve multiple purposes.

FIG. 2A illustrates an environment 200 in which the method 100 may be implemented. Referring to FIG. 2, the environment 200 includes a machine learning service computer system 210 (hereinafter also being sometimes referred to as "service system" or "service") that provides machine learning services to multiple client computer systems 260 and 270. The ellipsis 225 represents that the total number of client systems may be any plural number. Each of the client systems 260 and 270 and the service system 210 may be structured as described below for the computing system 1200 of FIG. 12.

The service system 210 includes a machine learning model collections 220 containing two or more machine learning models 221, 222 and 223. The ellipsis 224 represents that the total number of machine learning models contained in the machine learning service system 210 may be any plural number. Each of the different models 221, 222, and 223 is represented by a differently shape to symbolize that they are different models having different functions that contribute to the aggregated model in different ways. For instance, model 221 is represented by a rectangle, model 222 is represented by an oval, and model 223 is represented by a triangle. The service system 210 has access to the multiple machine learning models 221, 222, and 223 (act 101 of FIG. 1).

Each of the client systems 260 and 270 is capable of operating in at least one programing environment. A programming environment is a collection of components located on the client system. The programming environment may include language specific editors, debugging facilities, and/or any other hardware and software used by a programmer on the client system who may access the client codebase. For each of the programming environments that each of the client systems 260 and 270 may operate in, the corresponding client system contains corresponding client-specific data 261 and 271. For example, the client system 260 that operates in a particular programming environment (e.g., a Java programming environment) may contain the client-specific data 261, and the client system 270 that operates a particular programming environment (e.g., a C# programming environment) may contain the client-specific data 271. Each of the client systems 260 and 270 sends (represented by the arrow 262 and 272) the corresponding client-specific data 261 and 271 to the service system 210. On the service provider 210 side, the service provider 210 receives and accesses each of the corresponding client-specific data 261 and 271 (act 102 of FIG. 1).

The service system 210 then uses the client-specific data 261 and 271 to determine which subset of the multiple machine learning models is applicable to the corresponding client system 260 and 270 (act 103 of FIG. 1). For example, as illustrated in FIG. 2, the service system 210 uses the client-specific data 261 to determine that the model subset 231 is applicable to the client system 260, and uses the client-specific data 271 to determine that the model subset 232 is applicable to the client system 270 (also act 103 of FIG. 1).

Each of the client systems 260 and 270 may be capable of operating in multiple programming environments. There may be a separate set of client-specific data for each of the programming environments that may be operated in each of the client systems 260 and 270. For example, the client system 260 may be capable to operate in both a C++ programming environment and a Java programming environment. The client system 260 may contain a first set of client-specific data corresponding to the C++ programming environment, and a second set of client-specific data corresponding to the Java programing environment. When the client system 260 operates in a C++ programming environment, the service system 210 receives and uses the first set of client-specific data to determine a subset of models that are applicable to the C++ programming environment. When the client system 260 operates in a Java programming environment, the service system 210 receives and uses a second set of client-specific data to determine a subset of models that are applicable to the Java programming environment.

Figure 2B:
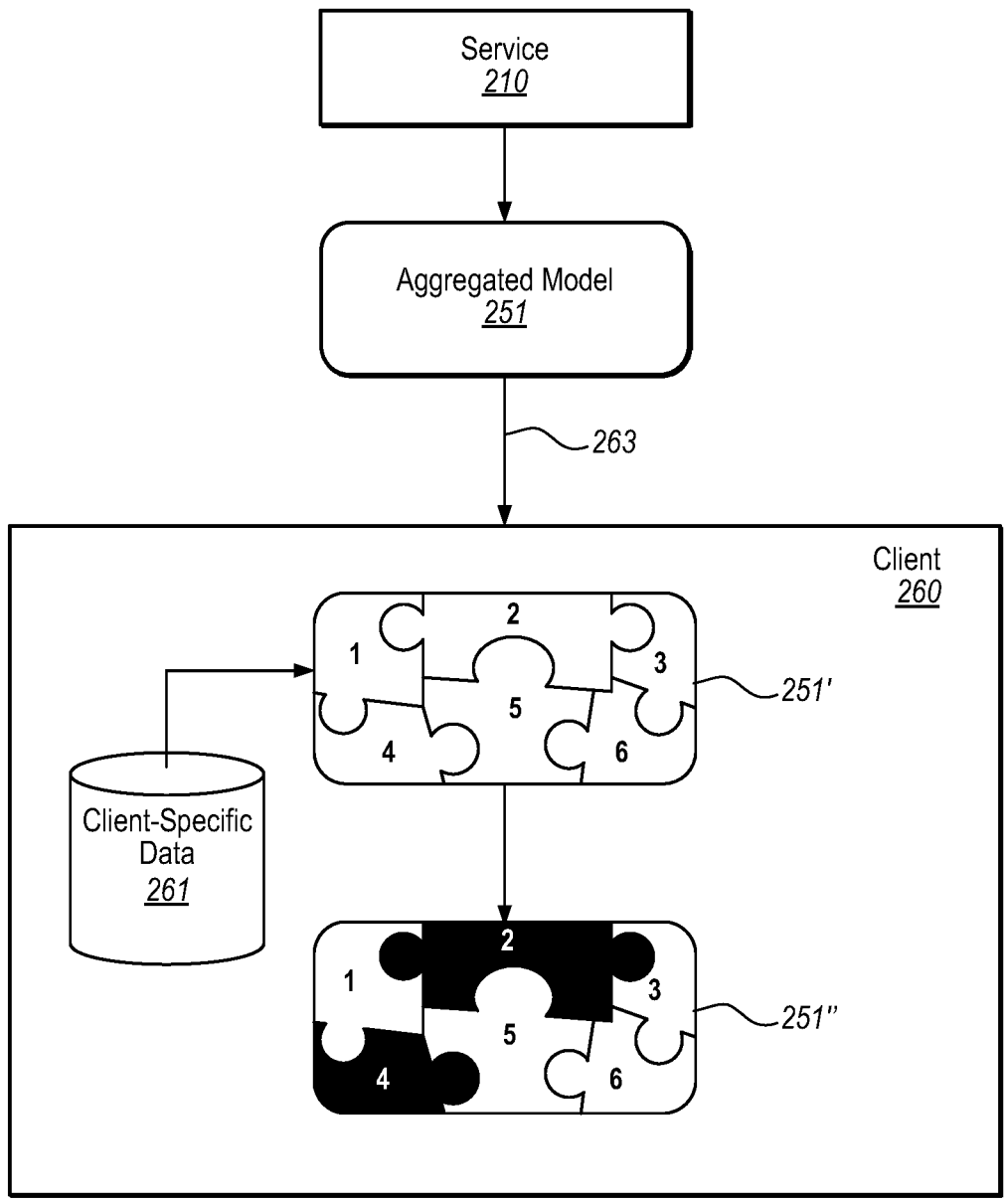
FIG. 2B illustrates an example environment in which the client system may further filter an aggregated model or a model received from the service system.

Furthermore, after the service system 210 determines an applicable model subset 231 and sends the model subset 231 or the aggregated model 251 to the client system 260 or 270, the client system 260 or 270 may further split and/or filter the aggregated model 251 or a particular model, so that only part of the aggregated model or the model applies. FIG. 2B illustrates an example environment in which the client system 260 receives and further split and/or filter an aggregated model 251.

Referring to FIG. 2B, the client system 260 receives an aggregated model 251 from the service system 210. The client system 260 may generate a copy of the aggregated model 251' on its own system and analyze the aggregated model 251' to determine that there are multiple separable parts contained in the model 251'. For example, as illustrated in FIG. 2B, there are 6 separable parts contained in the aggregated model 251'. Thereafter, the client system 260 further determines that some parts of the aggregated model 251' are not applicable to the client programming environment or component that is currently running on the client system 260. For example, as illustrated in FIG. 2B, parts 2 and 4 are determined to be not applicable. Accordingly, the client system 260 filters out of the parts 2 and 4 from the aggregated model 251' to generate a more concise model 251".

For instance, the aggregated model 251 may include recommendations for multiple versions of a particular component. However, the client system 260 may be running a particular version (e.g., the most recent version) of the component. As illustrated in FIG. 2B, parts 2 and 4 may be models that are only applicable to an earlier version of the component. Accordingly, the client system 260 filters out the parts 2 and 4, so that the inapplicable recommendations for earlier versions would not be generated for the client system 260.

There are different types of machine learning models 220 that may be included on the service system 210. Most machine learning models 220 can be classified into two basic groups: base models and custom models. Some models have wider applicability for more client computing environments; and some models may be only applicable to a certain client computing environment. A model that have wide applicability is called herein a "base model". A model that is generated for narrow and/or private purposes is called herein a "custom model". A custom model is often generated mainly for private purposes, e.g., within a team, an organization, or authorized users.

Furthermore, models may be generated from public codebases (e.g., open source codebases) or clients' proprietary codebases. The models generated from public codebases are often made public and allow free access. Such a model is called a "public model". It is also possible that an entity allows the use of its private codebase(s) in addition to the public codebases in the training process to produce a public model. Most of the public models are base models. The models generated from proprietary codebases are often not available for public access, thus called "private models". However, a private model may be a base model or a custom model. For example, a private model generated for a broadly used software developer's kit (SDK) may have a broad applicability, thus, be deemed as a base model. On the contrary, a model generated for a particular team would be a custom model. Generally, most of the custom models and/or private models are subject to the codebase owner's control and likely to require a permission to access; and public models may be published and allowed to be accessed by any entities.

The determination of the subset of the machine learning models may be based on many different factors. As an example, the determination may be based on the permissions granted. For instance, for each of at least some of these machine learning models, the service system 210 may determine whether the client system has permission to access the corresponding machine learning model. If it is determined that the client system has permission to access a particular machine learning model, then that may be a factor (amongst potentially other factors) in determining whether the permitted machine learning model is to be included in the model subset for the corresponding client. If the client does not have such permission, then the machine learning model is determined not to be included in the model subset.

The permission may be set by the clients or by the service provider. For example, if a model was built for a particular client, perhaps only the particular client may be permitted to use this model. Alternatively, this client may also grant permission of using this model to another entity (e.g., a contractor). The permission may also be set by the service provider. For example, by default, the service provider may determine that a model generated using a particular entity's data may not be used by any other entities. The service provider may also set the scope of permission for each of its clients based on their subscribed services. Also, the permission may be defined by both the service system 210 and the client system(s) 260 and 270.

The model subset may also be determined, at least in part, based on the datatype of the client data that is to be analyzed by machine learning service. The client system that operates in a programming environment has access to one or more codebases. A "codebase" may include source code, associated databases, test files, and/or metadata such as change history and changes made. The datatype of the client data includes a collection of code context corresponding to the one or more codebases. The code context may include (but are not limited to) programming language, application type, compiler information, SDK references, code quality metrics (e.g., average percentage of faults detected), whether the source code is test code or application code, and version of frameworks. The client specific data 261 or 271 may indicate the datatype of the client data that needs to be analyzed by machine learning. The service system 210 then filters the collection of the machine learning models 220 based on the datatype indicated. Perhaps only the models that are applicable to the determined datatype will be included in the model subset 231 or 232.

For instance, if a client codebase includes source code written in Java, the models that are applicable to the java codebases will be applicable and may be included in the subset of the models. Similarly, if a client codebase includes source code written in C#, the models that are applicable to the C# codebases will be applicable and may be included in the subset of the models.

Another example, the model 221 may be a machine learning model for predicting possible APIs for Java codebases; the model 222 may be a machine learning model for detecting variable misuses for Java codebases, and the model 223 may be a machine learning model for predicting possible APIs for C# codebases. The client-specific data 261 may be a java codebase. After the service system 210 determines that the client-specific data 261 is a java codebase, the service system filters the collection of models 220 to include models 221 and 222 in the model subset 231 for the client 260, because the model 221 (for predicting possible APIs for Java codebases) and the model 222 (for detecting variable misuses for Java codebases) are both applicable to the datatype of the client-specific data 261 (a Java codebase). However, the model 223 (for predicting possible APIs for C# codebases) would not be applicable to the datatype of the client-specific data 261 (a Java codebase). Thus, the model 223 is not included in the model subset 231 for the client 260.

Furthermore, different models may be more appropriate to different coding workloads. For instance, a model may be more applicable (or only be applicable) to a particular kind of component or application that is being worked on. For example, some models may be more applicable (or only applicable) to mobile device applications (e.g., smart phone apps), and some models may be more applicable (or only applicable) to console projects (e.g., Unix or windows command-line application). Even though a mobile device application and a console application may be written by a same programming language (e.g., C#), they usually follow very different patterns. Thus, the base models built from mobile device project codebases are likely to be more applicable to a mobile device application, and the base models built from console project codebases are likely to be more applicable to a console application.

For example, the client specific data 261 may include information related to what type of component or application is being worked on. For example, the client specific data 261 may indicate that the type of application being worked on by the client 270 is a mobile device application. Based on this information, the service system 210 determines that only the models that were built from mobile device project codebases are applicable to the client 270. Accordingly, only these applicable models are made available to the client system 270.

Additionally, there may be many different base models in the service system 220, and most of these base models are likely to allow public access. However, allowing each client system to access all of the base models or sending each client system all the available base models would take up unnecessary computing power and network resources, and might result in inappropriate suggestions being raised for the client system's usage at that time. Thus, the service system 220 may filter these base models based on the application type before making them available or sending them to the client system 270.

Similarly, custom models may also be filtered based on types of components or applications being worked on. In the same organizational entity, there may be different groups of programmers who are working on different types of components or applications. For example, a mobile app group may be mostly working on mobile device applications, and a console app group may be mostly working on console applications. Even though both of these groups are part of the same entity, and both of the groups may have permissions to access all the custom models built by the entity's codebases, it would be more efficient and allow better focus of the suggestions made by the models to the task at hand. Thus, the service system 210 may further filter the custom models that are related to the type of application that the client system is working on.

For example, the service system 210 may receive client-specific data 261 from the client system 270 of the mobile app group, indicating that the mobile app group is working on a mobile device project. Based on this information, the service system 210 filters out only the custom models that were built from mobile device projects to be sent to the client system 270 of the mobile app group. Similarly, a client system 260 of the console app group will only receive the applicable custom models that were built from console application codebases.

In some embodiments, a particular group within an entity may further set additional permission and/or restriction rules to allow and/or prohibit other teams within the entity to access certain models, or set additional recommendation rules that may be applied to the client system(s) of other teams. For example, a mobile app group may limit the models that are built from the mobile app group's codebases to its group members. Also, the mobile app group may set a specific recommendation rule to certain models that are built from the mobile app group's codebases to be recommended only to the client systems of the mobile app group, such that the service system 210 will not recommend these models to the client systems of console app group.

The principle of allowing a team to define permission or recommendation rules within the same entity may also be applied to multiple entities. For example, a first entity may grant a second entity permission to use certain models built from the first entity's codebases. Similarly, a first entity may prohibit a second entity from using such models.

In particular, there are many third-party software component authors or providers. A third party may create, update and distribute (e.g., sell) their software components to its customers. The service system 210 may allow a third party to grant permission to its customers for accessing certain models built from the third-party's codebases or the models built for the software components distributed to the customers. The service system 210 may also allow the third party to recommend and/or distribute relevant models to its customers when the third-party software component is being distributed or being used by a customer. Being able to distribute relevant models accompanying to its software components would add additional value to the third party's services to its customers. In some embodiments, a third party may be able to distribute recommended or relevant models in a cloud environment when the third party's software components are being used by a customer. The recommended or relevant models may be custom models generated from the third party's codebases or base models that are applicable to the software components being used by the customer.

In particular, the third party may provide some permission rules and/or recommendation rules to the service system 210, such that the service system 210 may filter the models based on rules provided by the third party. For example, the permission rules may include information related to the third party's customers. The information may include at least the customer system's identity information, the third party component being used by the customer system, and/or permissible custom models. The recommendation rules may include rules further filter the permitted custom models and/or base models, such that the service system 210 may further filter the permitted custom models to only include the recommended models. Accordingly, only the recommended models are made available or sent to the corresponding customer system.

As an example, when a customer (e.g., a developer who is incorporating a third party vendor's software component into its their system) is using the third party's software component on a customer system, the service system 210 may receive the customer system's client-specific data 261. In some embodiments, just the fact that the third party's component is in use may be enough for the service system 210 to apply the applicable filters. In some embodiments, additional customer system's client-specific data 261 may also be sent to the service system, such as the customer system's identity, IP address, geographical location, licensing information, etc. Accordingly, the service system 210 may restrict access to certain models by IP addresses, sovereign locations, domains and/or licensing information, etc. The service system 210 uses the client-specific data 261 to retrieve the rules defined by the third party and applicable to the particular customer system, such as permission rules and recommendation rules. Then, the service system 210 applies these retrieved rules to its machine learning model collections 220 and only makes the permitted and/or recommended custom models and/or base models available to the customer system.

In such an environment, the third party's system is a "client system" of the service system 210, and each of the third party's customer's systems is also a "client system" of the service system 210. However, the service system 210 grants different permissions and/or roles to each type of these client systems. The third party's system can set rules related to certain models that can restrict and/or permit other client systems to use these models. However, the customer's systems are likely not to be able to set rules related to any or most of the models, and are subject to the third party or other client's rules for accessing certain models.

Above described permission, datatype(s), and application type(s) are merely some examples of input to the determination of whether a model is applicable to the client system. Many other input factors may be used by the service system 210, such as, software component version information, limitations of the available resources, computer network speed, and so forth. Furthermore, the service system 210 may use multiple factors to make the determination.

After determining the machine learning model subset 231 and 232 for each of the client systems 260 and 270, each of the model subsets 231 and 232 is then aggregated via respective aggregator 241 and 242 into to a single respective integrated model 251 and 252 (act 104 of FIG. 1).

For instance, as illustrated in FIG. 2A, the model subset 231 includes a rectangular-shaped model 221 and an oval-shaped model 222. The rectangular-shaped model 221 and the oval-shaped model 222 are aggregated via the aggregator 241 to become the aggregated model 251. The aggregated model 251 is illustrated as a round-cornered rectangular, which represents that this newly created model 251 is an integrated combination of the rectangular-shaped model 221 and the oval-shaped model 222. Similarly, the model subset 232 includes an oval-shaped model 222 and a triangle-shaped model 223. The oval-shaped model 222 and the triangle-shaped model 223 are aggregated via the aggregator 242 to become the single aggregated model 252. The aggregated model 252 is illustrated as a round-cornered triangle, which represents that this newly created model 252 is a combination of the oval-shaped model 222 and a triangle-shaped model 223.

Each of the aggregated models 251 and 252 are customized to the corresponding client system and also capable of performing multiple functions. Using the same object/facial/voice recognition example described above, the aggregated model 251 is capable of performing both the object recognition (the function of model 221) and facial recognition (the function of model 222), and the aggregated model 252 is capable of performing facial recognition (the function of model 222) and speech recognition (the function of model 223). Thus, aggregated model 251 is customized to the capability and data present at the client 260, and the aggregated model 252 is customized to the capability and data present at the client 270. The arrows 263 and 273 represent that each of these custom machine learning models 251 and 252 is then sent back (or made available) to each of the corresponding client systems 260 and 270.

Another example, the machine learning models 221 and 222 may be models for helping computer programmers to efficiently write programming code on the client system. In particular, the model 221 may be able to predict possible completions, the predicted and/or recommended (based on the code context) source code may pop up as a computer programmer types. If the programmer continues typing characters, the list of members (variables, methods, etc.) is filtered to include only members containing the additionally typed characters. The model 222 may be able to detect one or more possible code misuses within the client programming environment. In response to the detection of possible code misuse, a possible solution to correct at least one of the detected possible code misuses may be recommended to the client. Accordingly, when models 221 and 222 are aggregated into one integrated machine learning model 251, the integrated machine learning model 251 may perform both auto-completion and error detections for the client system 260.

Each of the aggregators 241 and 242 may be an executable component controlled by either the client systems 260 and 270 or by the service system 210. As illustrated in FIG. 2, the aggregators 241 and 242 and the aggregated models 251 and 252 are shown between the service computer system 210 and the client computer systems 260 and 270, symbolizing that the aggregator(s) 241, 242 or the act of aggregating 104 may be implemented on either or both of the service computer system 210 or the respective client computer systems 260 and 270.

Figure 3:
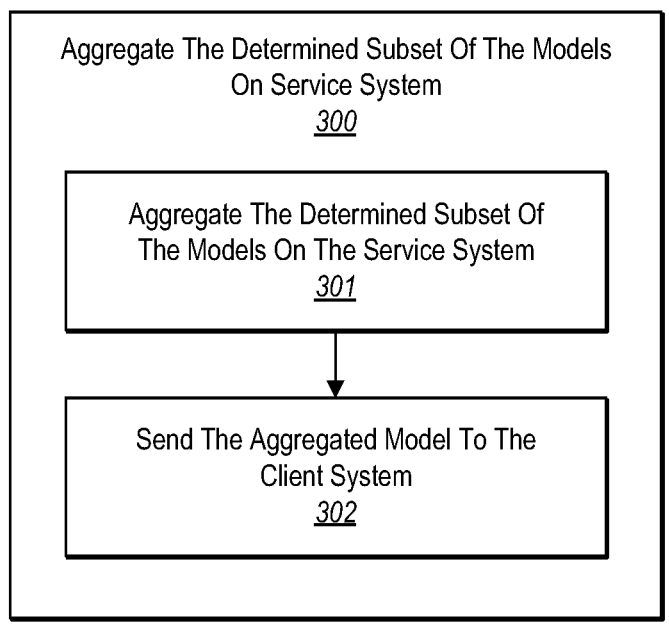
FIG. 3 illustrates a flowchart of a method for aggregating a subset of machine learning models on a service provider's computer system.
Figure 4:
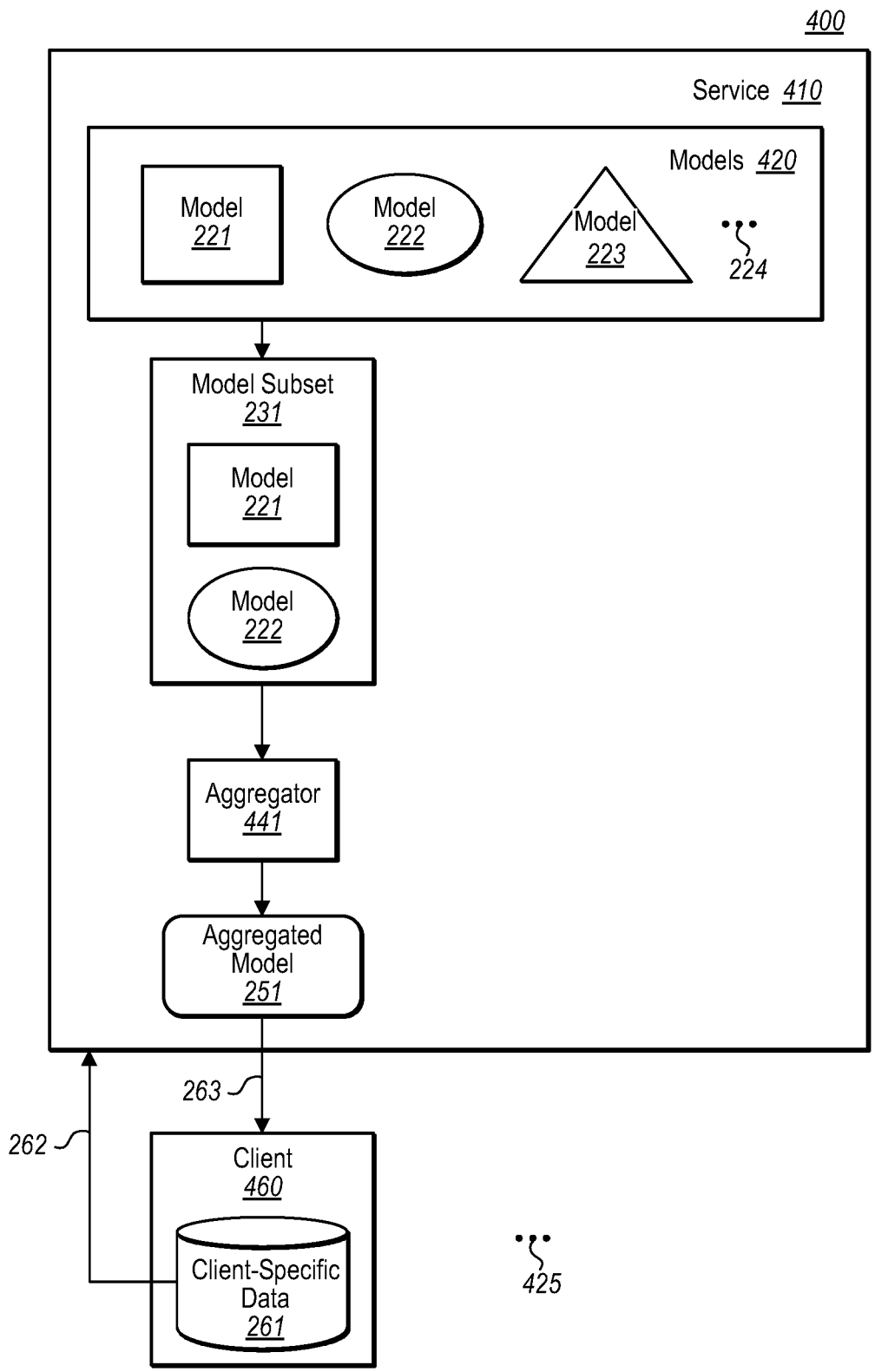
FIG. 4 illustrates an environment in which the method illustrated in FIG. 3 may be implemented.
Figure 5:
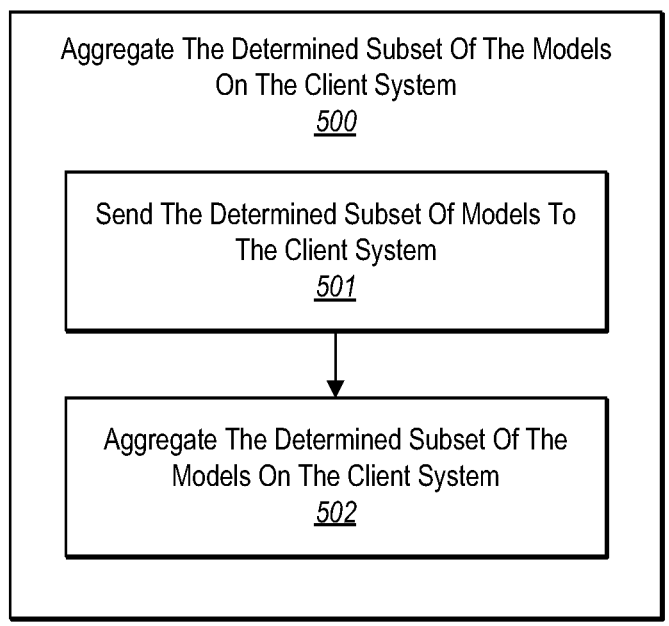
FIG. 5 illustrates a flowchart of a method for aggregating a subset of machine learning models on a client computer system.
Figure 6:
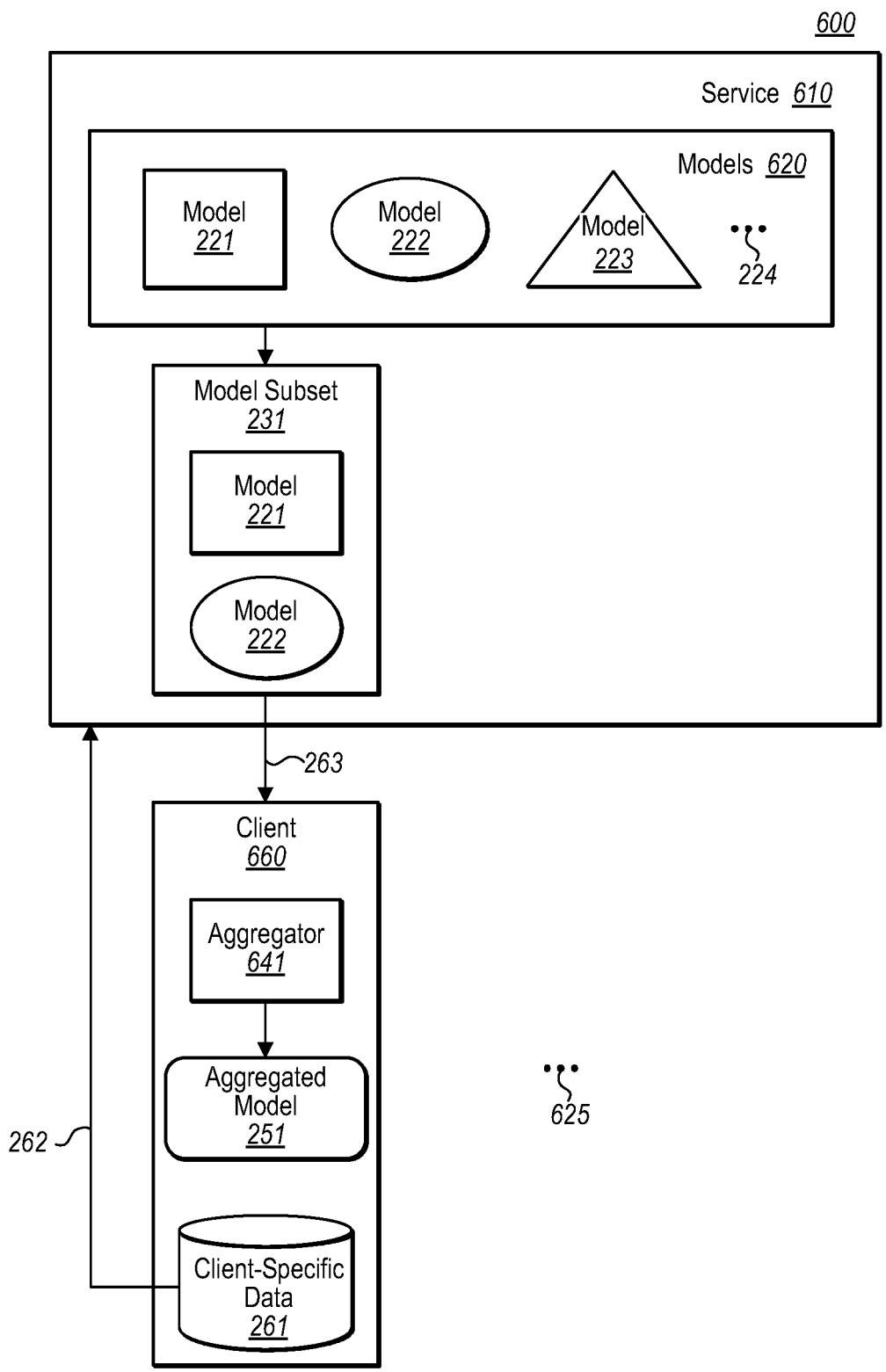
FIG. 6 illustrates an environment in which the method illustrated in FIG. 5 may be implemented.
Figure 7:
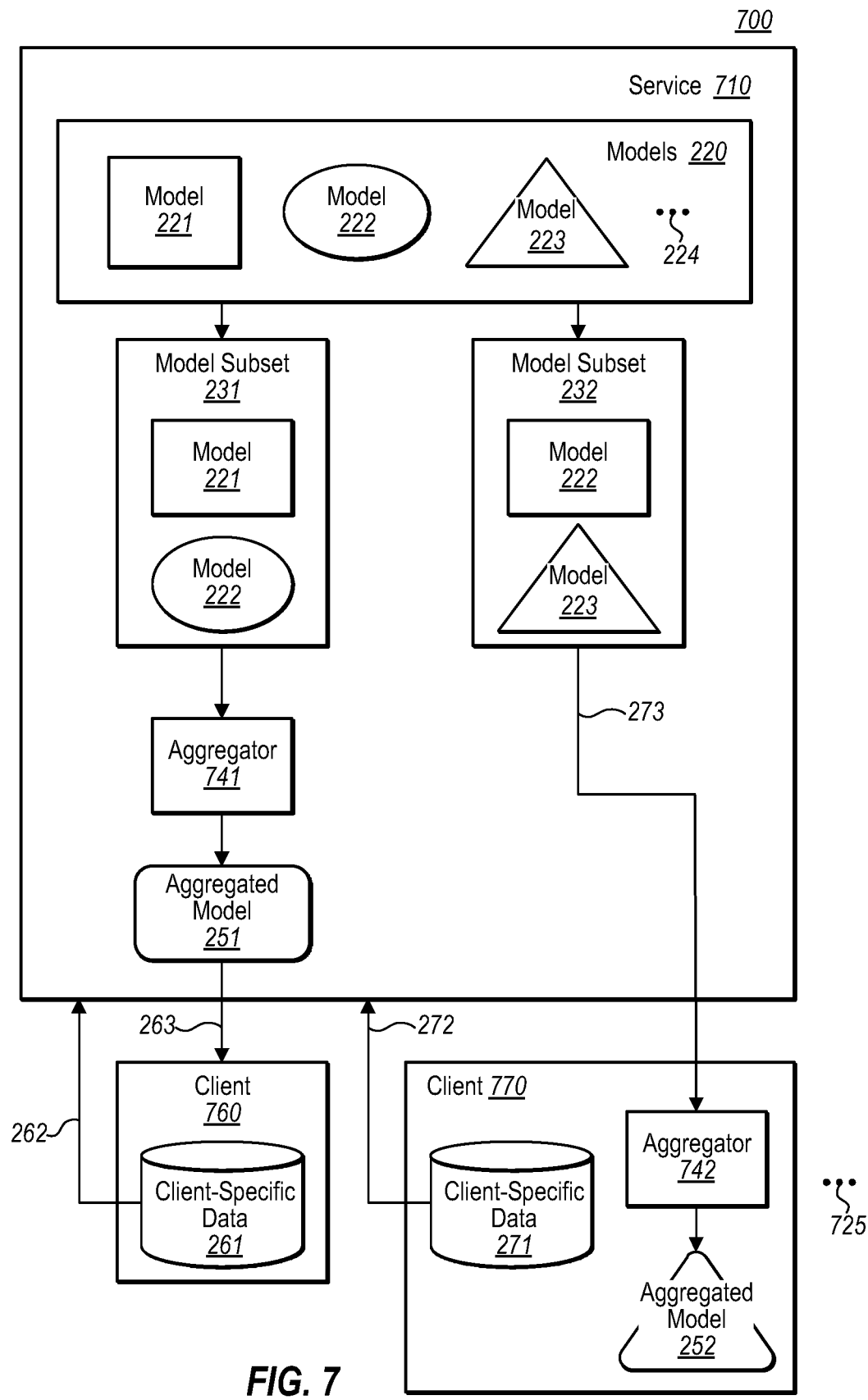
FIG. 7 illustrates an environment in which a method for allowing some clients' models be aggregated on the service computer system and some clients' models be aggregated on the client computer system.

More details regarding how the subset models 231 and 232 are aggregated are now described further below with respect to FIGS. 3 through 7. FIGS. 3 and 4 illustrates an example in which the aggregator(s) 241 or 242 may be implemented on the service system 210. FIGS. 5 and 6 illustrates an example where the aggregator(s) 241 and 242 may be implemented on each of the client systems 260 and 270. FIG. 7 illustrates an example where some or a portion of the aggregator(s) 241 may be implemented on the service system 210, and some or a portion of the aggregator(s) 242 may be implemented on the corresponding client system 270.

Since FIGS. 3 and 4 are closely related to each other, FIGS. 3 and 4 now will be described together. FIG. 3 illustrates a flowchart of a method 300 for aggregating the determined subset of the machine learning models on the service provider's computer system. Method 300 is an example of how act 104 of FIG. 1 may be performed. FIG. 4 illustrates an environment 400 in which the method 300 may be implemented.

Referring to FIGS. 3, the method 300 for aggregating the determined subset of the machine learning models includes aggregating the determined subset of the models on the service system (e.g., service 210 of FIG. 2) (act 301). The service system then sends each of the aggregated models (e.g., aggregated models 251 and 252) to each of the corresponding client systems (e.g., client systems 260 and 270 of FIG. 2) (act 302). The service system 210 may also store the previously generated model subsets. When the service system 210 receives a service request from the client system 260, the service system 210 may determine whether the existing model subset is still correct. If the existing model subset is still correct, the service system 210 will simply send the previously generated model subset to the client system 260.

Furthermore, the service system 210 may retrieve an existing model subset, perform additional filtering on the existing model subset to generate a new model subset, and the new model subset is then sent to the client system. For example, the model subset may include one or more base models and one or more custom models. The base models may remain the same, but some of the custom models may be no longer applicable, or vice versa. In such a case, the service system 210 may determine that a portion of the existing model subset is no longer applicable and filter out the no-longer-applicable models from the existing model subset, and the service system 210 may also add additional applicable models to the existing model subset.

In some embodiments, when the service system 210 determines that some model(s) in an existing model subset is no longer correct, and that an updated model has not been generated, the service system 210 may initiate the process of generating an updated model. After an updated model is generated, the service system 210 then aggregates the updated model and the other still-correct models into an updated model subset, and send the updated model subset to the client system.

FIG. 4 illustrates an environment 400 in which the method 300 may be implemented. Referring to FIG. 4, similar to FIG. 2, the environment 400 includes a service system 410 and a client system 460. The ellipsis 425 represents that the total number of client systems may be any plural number. The client system 460 may be any one of the client systems that receives machine learning services from the service system 410. The client system 460 contains the client-specific data 261 that was illustrated and described with respect to FIG. 2.

The service system 410, also similar to the service system 210 to FIG. 2, contains the machine learning model collection 220. The service system 410 has access to the multiple machine learning models 221 through 224 (again, act 101 of FIG. 1). The service system 410 receives (represented by arrow 262) the client-specific data 461 from the client system 460 (act 102 of FIG. 1). Based on the client-specific data 461, the service system 410 determines a model subset 231 that is applicable to the client system 460 (act 103 of FIG. 1). For example, as illustrated in FIG. 4, the service system 410 determined that the model subset 231 includes the model 221 (illustrated by a rectangle) and model 222 (illustrated by an oval).

The service system 410 also includes an aggregator 441, which aggregates the model subset 231 into the aggregated model 251 (act 301). After the service system 410 generates the aggregated model 251, the service system 410 then sends (act 302 in FIG. 3, see also arrow 263 in FIG. 4) the aggregated model 251 to the client system 460. On the one hand, the service system might allocate an aggregator for each of the client systems. On the other hand, the service system may have one aggregator that performs the aggregation for all the client systems. Broadly stated, there may be any number of aggregators, each of which is allocated to perform aggregations for any number of client systems.

Furthermore, the service system 410 may have access to the programing environment on the client system 460 and run the aggregated model 251 on the service side. The service system 410 may use the information related to the client system 460's programming environment to run the aggregated model 251 on its own side, and send the result of the aggregated model 251 to the client system 460. In some embodiments, only for some models, the process of inference may be run on the service system, and the model results are sent back to the client system.

In contrast to FIGS. 3 and 4, the aggregator(s) may also be implemented on each of the client systems, as will now be described with respect to FIGS. 5 and 6. FIG. 5 illustrates a flowchart of a method 500 for aggregating the subset of the multiple machine learning models on a client computer system. Method 500 is also an example of how act 104 of FIG. 1 may be performed. FIG. 6 illustrates an environment 600 in which the method 500 may be implemented.

Referring to FIG. 5, the method 500 includes sending the determined subset of multiple machine learning models to the corresponding client's system (act 501). The client system then aggregates the determined subset of the multiple machine learning models (act 502).

FIG. 6 illustrates an environment 600 in which the method 500 may be implemented. Referring to FIG. 6, similar to FIGS. 2 and 4, the environment 600 includes a service system 610 and a client system 660. The ellipsis 625 represents that the total number of client systems may be any plural number. The client system 660 may be any one of the client systems that receives machine learning services from the service system 610. The client system 660 contains the client-specific data 261.

The service system 610 again contains the machine learning model collection 220 (act 101 of FIG. 1). The service system 610 receives (represented by arrow 262) and accesses the client-specific data 261 from the client system 660 (act 102 of FIG. 1). Based on the client-specific data 661, the service system 610 determines a model subset 231 that is applicable to the client system 660 (act 103 of FIG. 1).

However, unlike that in FIG. 4, the service system 610 here does not have an aggregator. Instead, the client system 660 includes an aggregator 641. After the service system 610 determines the model subset 231 (act 103 of FIG. 1), the model subset 231 is sent (represented by arrow 263) to the client system 660 (act 501). The model subset 231 is then aggregated by the aggregator 641 on the corresponding client system 660 (act 502).

The client system 260 may also be allowed to store a previously generated model subset. The model subset does not need to be regenerated unless some changes occur, and/or the existing model subset is no longer applicable to the client's environment. For instance, the client system 260 may send to the service system 210 the information related to an existing model subset. Based on the information received, the service system 210 determines whether the existing model subset is still correct. If the existing model subset is still correct, the service system will response to the client system with an indication that a new model subset needs not be generated. On the contrary, if the previously generated model subset (e.g., at least one of the models in the existing model subset) is no longer correct or out of date, the service system will then identify a correct subset of models and send the correct model subset to the client system 260.

For example, the service system 210 may determine that among an existing model subset, only a particular custom model is no longer correct, and the rest of the models in the existing model subset are still correct. In such a case, the service system 210 may simply inform the client system that the particular custom model is no longer correct. Furthermore, if the service system contains an updated custom model (corresponding to the particular custom model), the service system may send the updated custom model to the client system 260. Alternatively, if the service system 210 does not have an updated custom model in its repository yet, the service system 210 may initiate a new custom model generation process to rebuild the particular custom model. After the new custom model is generated, the service system 210 may then send the updated custom model to the client system 260. After the client system 260 receives an updated custom model, the client system 260 may perform a new aggregation process aggregating the newly updated custom model and the other existing models into an updated aggregated model.

Similarly, the service system 210 may determine that among the existing model subset, a base model is no longer correct due to certain changes of the client's programing environment (e.g., the version of the client's programming framework may have changed). The service system 210 may send the correct base model to the client system 260 and indicate that the existing base model should be replaced by the newly sent base model. Similarly, after the client system 260 receives the updated base model, a new aggregation process may be performed to aggregating the newly received base model and the other existing models into a new aggregated model.

As illustrated in FIGS. 5 and 6, each of the client systems aggregates its own subset of models. This may reduce the computation burden placed on the service system 610. This may also allow the client system 660 to choose to aggregate or not aggregate the models, or only aggregate a portion of the determined model subset 231. Furthermore, if the existing model subset is still applicable to the client programming environment, the service system 610 may indicate the same to the client system 660, and there is no need to regenerate and/or resend models to the client system.

In some embodiments, both the client and the service system may include an aggregator. For instance, for a given client, the service system might perhaps perform a part of the aggregation and send the partially aggregated subsets to the client system. The client system may then complete the aggregation by assembling the partially aggregated subsets. For instance, suppose that the model subset includes models A, B and C. In that case, the service system might aggregate only models A and B to generated model AB. Then, the service system may send the model AB and the model C to the client system, whereupon the client system aggregates these two models into model ABC.

Furthermore, the service system may provide different services to different client systems. Some client systems may include an aggregator and aggregate the subset of models on their own systems. Some client systems may not include an aggregator and have the service system aggregate the subset of the models for them. FIG. 7 illustrates an environment 700 in which the aggregation for some of the client systems is performed on the service system, and the aggregation for some other client systems is performed on the corresponding client systems.

FIG. 7 is an example environment 700 in which for one client, the aggregation occurs on the service system, and for another client, the aggregation occurs on the client system. Specifically, as an example, the service system 710 includes an aggregator 741 that aggregates the model subset 231 for the client system 460, whereas the client system 770 includes its own aggregator 742 and aggregates the model subset 232 on its own system 770. The elements 220 through 224, 231, 232, 251, 252, 262, 263, 272 and 273 may be similar to the respective elements of FIG. 2. Accordingly, the service system 710 may provide different services to different client systems 460 and 770, and each of the service systems 460 and 770 may choose different services based on their wants and need.

Principles described herein allows a machine learning service (e.g. service 210 of FIG. 2) to provide customized machine learning services to different clients (e.g., clients 260 and 270). In particular, when a cloud-based machine learning service is provided, there is regular communication between the service and the client systems. Limiting the data transmission to the applicable models and relevant client-specific data not only increases the speed and accuracy of the service, but also reduces the risk of leaking proprietary information between each of the parties.

Figure 8:
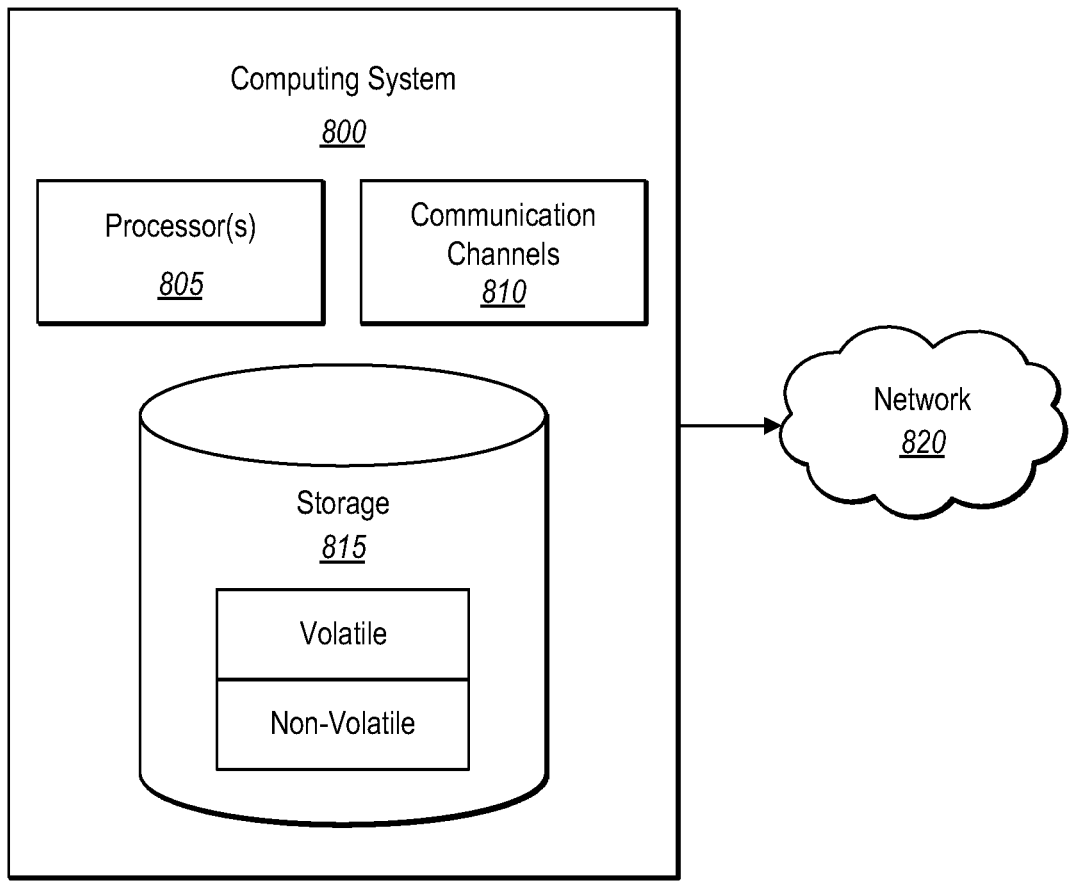
FIG. 8 illustrates an example computer system in which the principles described herein may be implemented.

Finally, because the principles described herein operate in the context of a computer system, a computer system will be described with respect to FIG. 8. As illustrated in FIG. 8, in its most basic configuration, a computer system 800 includes various different components. As used herein, "computer system" and simply "computer" are synonymous terms that may be interchanged with each other. FIG. 8 also shows that computer system 800 includes at least one hardware processing unit 805 (aka a "processor"), communication channel(s) 810, and storage 815.

The storage 815 may be physical system memory, which may be volatile, non-volatile, or some combination of the two. Accordingly, the storage 815 may be referred to as a "hardware storage device" on which computer-executable instructions are stored. The term "memory" may also be used herein to refer to non-volatile mass storage such as physical storage media.

If the computer system 800 is distributed, the processing, memory, and/or storage capability may be distributed as well. As used herein, the term "executable module," "executable component," or even "component" can refer to software objects, routines, or methods that may be executed on the computer system 800. The different components, modules, engines, and services described herein may be implemented as objects or processors that execute on the computer system 800 (e.g. as separate threads).

The disclosed embodiments may comprise or utilize a special-purpose or general-purpose computer including computer hardware, such as, for example, one or more processors (such as hardware processing unit 805) and system memory (such as storage 815), as discussed in greater detail below. Embodiments also include physical and other computer-readable media for carrying or storing computer-executable instructions and/or data structures.

Such computer-readable media can be any available media that can be accessed by a general-purpose or special-purpose computer system. Computer-readable media that store computer-executable instructions in the form of data are physical computer storage media. Computer-readable media that carry computer-executable instructions are transmission media. Thus, by way of example and not limitation, the current embodiments can comprise at least two distinctly different kinds of computer-readable media: computer storage media and transmission media.

Computer storage media are hardware/physical storage devices, such as RAM, ROM, EEPROM, CD-ROM, solid state drives (SSDs) that are based on RAM, Flash memory, phase-change memory (PCM), or other types of memory, or other optical disk storage, magnetic disk storage or other magnetic storage devices, or any other medium that can be used to store desired program code means in the form of computer-executable instructions, data, or data structures and that can be accessed by a general-purpose or special-purpose computer.

The computer system 800 may also be connected (via a wired or wireless connection) to external sensors (e.g., data acquisition devices). Further, the computer system 800 may also be connected through one or more wired or wireless networks 820 to remote systems(s) that are configured to perform any of the processing described with regard to computer system 800.

A "network," like the network 820 shown in FIG. 8, is defined as one or more data links and/or data switches that enable the transport of electronic data between computer systems, modules, and/or other electronic devices. When information is transferred, or provided, over a network (either hardwired, wireless, or a combination of hardwired and wireless) to a computer, the computer properly views the connection as a transmission medium. As illustrated, the computer system 800 includes one or more communication channel(s) 810 (e.g., TCP ports, UDP ports, etc.) that are used to communicate with the network 820.

Transmissions media include a network that can be used to carry data or desired program code means in the form of computer-executable instructions or in the form of data structures. Further, these computer-executable instructions can be accessed by a general-purpose or special-purpose computer. Combinations of the above should also be included within the scope of computer-readable media.

Upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a network interface card or "NIC") and then eventually transferred to computer system RAM and/or to less volatile computer storage media at a computer system. Thus, it should be understood that computer storage media can be included in computer system components that also (or even primarily) utilize transmission media.

Computer-executable (or computer-interpretable) instructions comprise, for example, instructions that cause a general-purpose computer, special-purpose computer, or special-purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the embodiments may be practiced in network computing environments with many types of computer system configurations, including personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, cloud-based machines and infrastructures, and the like. The embodiments may also be practiced in distributed system environments where local and remote computer systems that are linked (either by hardwired data links, wireless data links, or by a combination of hardwired and wireless data links) through a network each perform tasks (e.g. cloud computing, cloud services and the like). In a distributed system environment, program modules may be located in both local and remote memory storage devices.

Additionally or alternatively, the functionality described herein can be performed, at least in part, by one or more hardware logic components. For example, and without limitation, illustrative types of hardware logic components that can be used include Field-Programmable Gate Arrays (FPGAs), Program-Specific or Application-Specific Integrated Circuits (ASICs), Program-Specific Standard Products (ASSPs), System-On-A-Chip Systems (SOCs), Complex Programmable Logic Devices (CPLDs), Central Processing Units (CPUs), and other types of programmable hardware.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for providing custom machine learning models to a computer system, said method comprising:
   accessing data for the computer system;
   using the data to select a set of machine learning models that are determined to be applicable to the computer system, wherein the computer system is facilitating development of a codebase in a programming language such that machine learning models that are directed to codebase development are ones that are determined to be applicable to the computer system, and wherein determining which machine learning models are to be included in the set is performed by:
   determining attributes associated with the data;
   accessing a plurality of machine learning models;
   using the attributes to filter the plurality of machine learning models, resulting in identification of machine learning models that are directed to codebase development, wherein said filtering involves identification of a particular machine learning model that detects variable misuses for codebases that are developed in said programming language;

using machine learning to build an additional model that is applicable to the computer system based on the determined attributes; and including at least the built model and the particular machine learning model in the set of machine learning models; and aggregating the set to generate an aggregated set of machine learning models that are customized to the computer system.

2. The method of claim 1, wherein said filtering is further based on a type of an application being designed or implemented by the computer system.

3. The method of claim 1, wherein the aggregate set of machine learning models is aggregated into a single integrated model that is customized to the computer system.

4. The method of claim 1, wherein the computer system operates in a programming environment that includes language specific editors and debugging facilities.

5. The method of claim 1, wherein the computer system operates in multiple programming environments, and wherein separate data is accessible for each of the multiple programming environments.

6. The method of claim 1, wherein the aggregate set of machine learning models is aggregated into a single integrated model that is customized to the computer system, and wherein the single integrated model is caused to operate in a split manner so that only a part of the single integrated model operates for the computer system.

7. The method of claim 1, wherein a first model included in the set of machine learning models is a base model.

8. The method of claim 7, wherein a second model included in the set of machine learning models is a custom model.

9. The method of claim 8, wherein one of the base model or the custom model is generated from a public codebase.

10. One or more hardware storage devices that store instructions that are executable by one or more processors to cause the one or more processors to:

access a plurality of machine learning models;

access data for a computer system;

use the data to determine which subset of the plurality of machine learning models is applicable to the computer system, wherein the computer system is facilitating development of a codebase in a programming language such that machine learning models that are directed to codebase development are ones that are determined to be applicable to the computer system, and wherein determining which machine learning models are to be included in the subset is performed by:

determining attributes associated with the data;

using the attributes to filter the plurality of machine learning models, resulting in identification of machine learning models that are directed to codebase development, wherein said filtering involves identification of a particular machine learning model that detects variable misuses for codebases that are developed in said programming language;

using machine learning to build an additional model that is applicable to the computer system based on the determined attributes; and including at least the built model and the particular machine learning model in the subset; and aggregate the subset to generate an aggregated set of machine learning models that are customized to the computer system.

11. The one or more hardware storage devices of claim 10, wherein a first model is included in the subset, and wherein the first model is generated for a particular team.

12. The one or more hardware storage devices of claim 10, wherein a first model is included in the subset, and wherein the first model is generated for a software developer kit (SDK).

13. The one or more hardware storage devices of claim 10, wherein a first model is included in the subset, and wherein the first model is subject to a codebase owner's control.

14. The one or more hardware storage devices of claim 10, wherein determining which machine learning models are to be included in the subset is based on a permissions factor.

15. The one or more hardware storage devices of claim 14, wherein the permission factor is set by a client or a service provider.

16. The one or more hardware storage devices of claim 14, wherein a service provider sets a scope of permissions based on a determined subscription service associated with the computer system.

17. The one or more hardware storage devices of claim 10, wherein determining which machine learning models are to be included in the subset is based on a group membership determination.

18. A computer system that provides custom machine learning models to a computer system, said computer system comprising:

at least one processor; and at least one hardware storage device having stored thereon instructions that are executable by the at least one processor to cause the computer system to:

access data for a device;

use the data to select a set of machine learning models that are determined to be applicable to the device, wherein the computer system is facilitating development of a codebase in a programming language such that machine learning models that are directed to codebase development are ones that are determined to be applicable to the computer system, and wherein determining which machine learning models are to be included in the set is performed by:

determining attributes associated with the data;

accessing a plurality of machine learning models;

using the attributes to filter the plurality of machine learning models, resulting in identification of machine learning models that are directed to codebase development, wherein said filtering involves identification of a particular machine learning model that detects variable misuses for codebases that are developed in said programming language;

using machine learning to build an additional model that is applicable to the device based on the determined attributes; and including at least the built model and the particular machine learning model in the set of machine learning models; and aggregate the set to generate an aggregated set of machine learning models that are customized to the device.

19. The computer system of claim 18, wherein a first model in the set of machine learning models is designed to write programming code.

20. The computer system of claim 18, wherein a first model included in the set of machine learning models is a base model or a custom model.

* * * * *